C. M. LEECH.
COMBINED TRANSMISSION AND DIFFERENTIAL GEAR.
APPLICATION FILED DEC. 18, 1909.

977,887.

Patented Dec. 6, 1910.
3 SHEETS—SHEET 1.

Witnesses
J. S. Freeman.

Inventor
Charles M. Leech,
By C. L. Parker,
Attorney

C. M. LEECH.
COMBINED TRANSMISSION AND DIFFERENTIAL GEAR.
APPLICATION FILED DEC. 18, 1909.

977,887.

Patented Dec. 6, 1910.
3 SHEETS—SHEET 2.

Witnesses
J. S. Freeman

Inventor
Charles M. Leech,
By C. L. Parker, Attorney

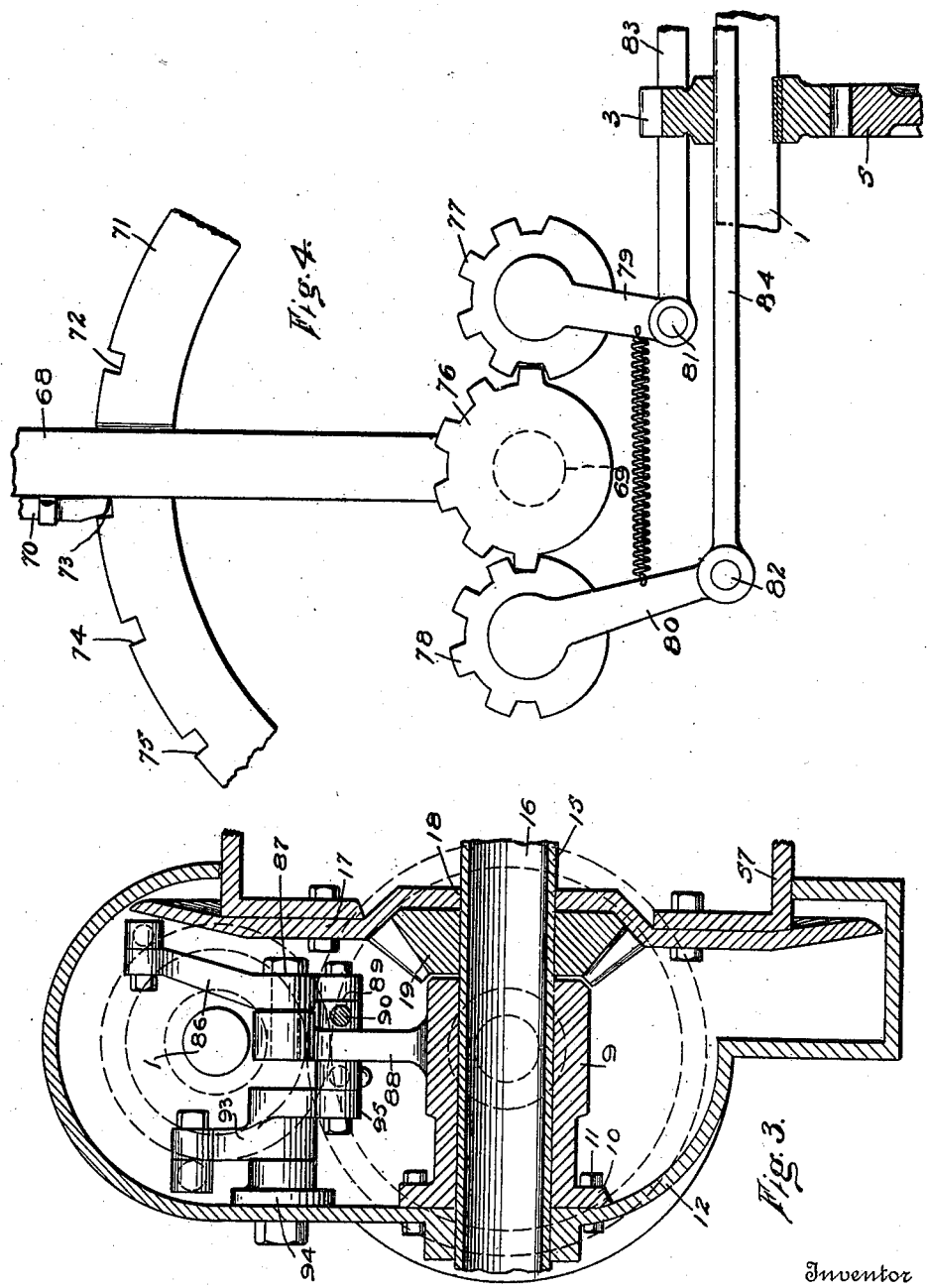

UNITED STATES PATENT OFFICE.

CHARLES M. LEECH, OF LIMA, OHIO.

COMBINED TRANSMISSION AND DIFFERENTIAL GEAR.

977,887.  Specification of Letters Patent.  Patented Dec. 6, 1910.

Application filed December 18, 1909. Serial No. 533,792.

*To all whom it may concern:*

Be it known that I, CHARLES M. LEECH, a citizen of the United States, residing at Lima, in the county of Allen and State of Ohio, have invented certain new and useful Improvements in Combined Transmission and Differential Gear, of which the following is a specification.

My invention relates to a combined transmission and differential gear.

An important object of my invention is to provide a device of the above character, which is controlled by a single lever.

A further object of my invention is to provide a combined transmission and differential gear, which may be constructed to occupy a relatively small space, and which will be reliable in its operation.

My invention consists generally in the arrangement and combination of parts to be hereinafter described.

Figure 1:
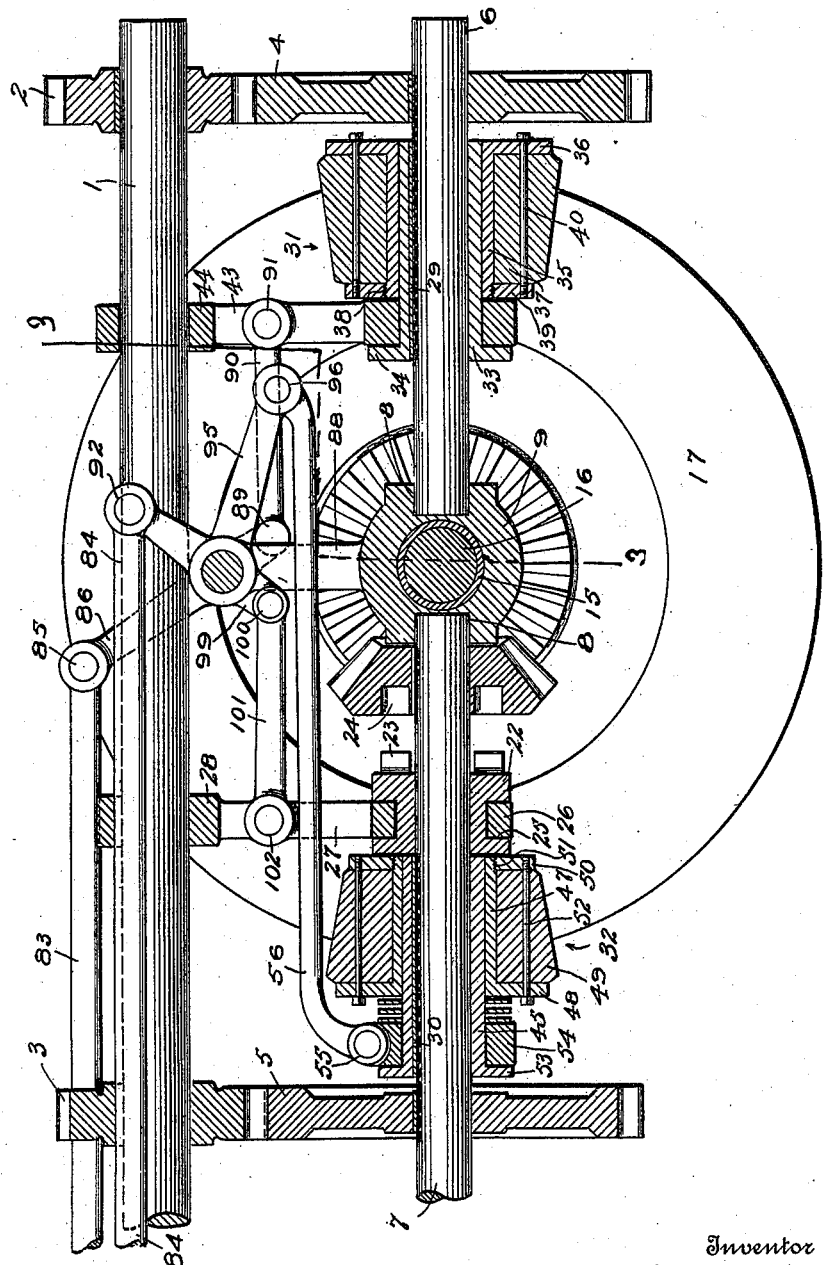
Figure 2:
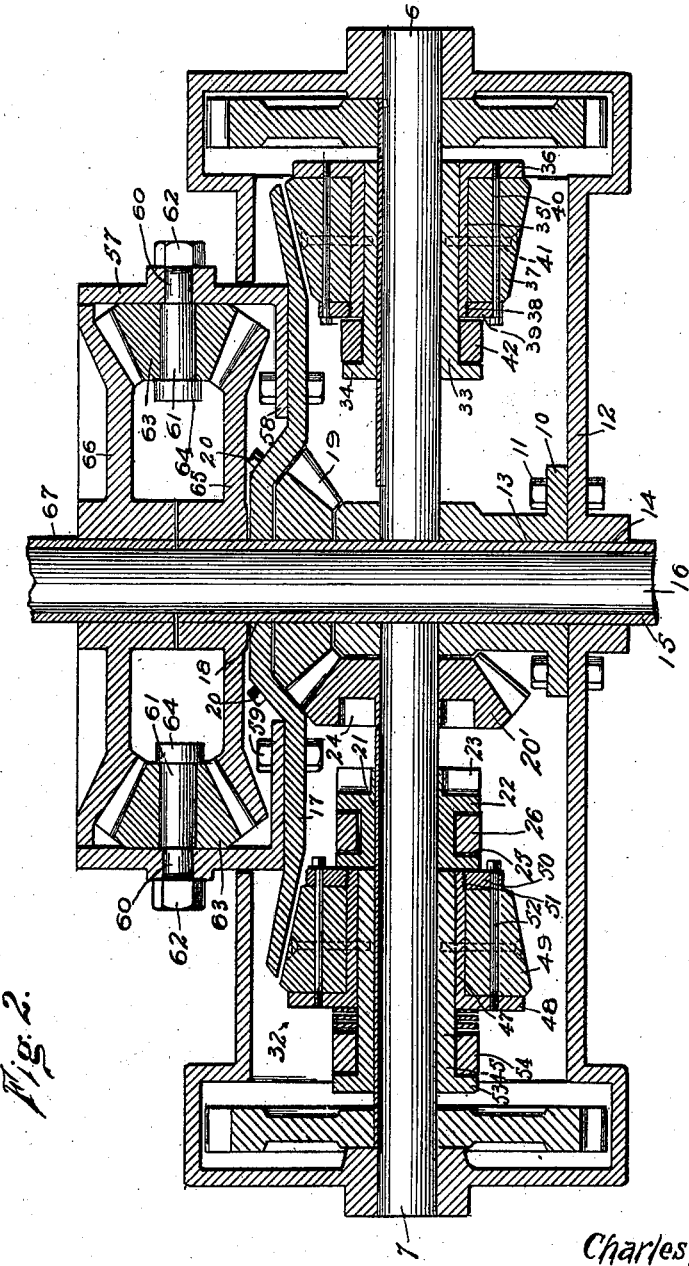

In the accompanying drawings, forming a part of this specification, and in which like numerals are used to designate like parts throughout the same, Figure 1 is a fragmentary side elevation of my device, partly in section, Fig. 2 is a horizontal sectional view of the same, Fig. 3 is a cross-sectional view taken on line 3—3 of Fig. 1. Fig. 4 is a fragmentary side elevation of the controlling lever and associated members.

In the preferred embodiment of my invention, as illustrated in the accompanying drawings, 1 designates the driving shaft of a motor vehicle which is rotated by any suitable form of engine (not shown). The driving shaft 1 is provided with spaced pinions 2 and 3 which are rigidly secured thereto by any suitable means. The pinions 2 and 3 mesh with larger pinions 4 and 5 respectively, which in turn are rigidly mounted upon shafts 6 and 7 respectively. The shafts 6 and 7 are parallel to the driving shaft 1 and have their inner ends rotatably mounted as at 8, within a fixed support 9. The support 9 is provided with a flanged end 10, which is rigidly secured by means of bolts 11 to the central portion of a casing 12. The support 9 and casing 12 are provided with registering cylindrical openings 13 and 14, within which is rotatably mounted a cylindrical sleeve 15. Within the cylindrical sleeve 15 is loosely mounted a stationary cylindrical shaft 16, which may serve as a rear axle for the vehicle, or a transverse driving shaft for a chain drive vehicle.

Within the casing 12, a friction disk 17 is rotatably mounted upon the sleeve 15 as at 18, and said friction disk 17 is bent at its central portion to form a recess within which is disposed a bevel gear 19, which is loosely mounted upon the sleeve 15 and rigidly connected to the friction disk 17 by means of bolts 20. The bevel gear 19 slidably engages the support 9 and is disposed to mesh with a bevel gear 20' which is loosely mounted upon the shaft 7 near its inner end. Keyed upon the shaft 7 as at 21 is a clutch head 22 provided upon its inner end with a clutch face 23, which is adapted to coöperate with a corresponding clutch face 24 formed upon the outer end of the bevel gear 20'. It is obvious by this construction that the clutch head 22 is rotated by the shaft 7 and is capable of moving longitudinally of said shaft 7 for engagement with the pinion 20', whereby said pinion may be rigidly locked to the shaft 7. The clutch head 22 is provided with a peripheral groove or recess 25 within which is loosely mounted a ring 26, upon the upper side of which is formed an upstanding arm 27 provided with an enlarged apertured head 28, which is loosely mounted upon the driving shaft 1. The arm 27 together with its head 28 is moved longitudinally of the shaft 1 by means to be hereinafter described. The shafts 6 and 7 are arranged in the same horizontal plane with the shaft or axle 16, and the shafts 6 and 7 are arranged in front of the friction disk 17 and extend diametrically of the same. Upon the shafts 6 and 7 are keyed as at 29 and 30 beveled frictional pulleys designated as a whole by the numerals 31 and 32 respectively. The friction pulleys 31 and 32 engage the friction disk 17 near its periphery and at diametrically opposite points. The friction pulley 31 comprises a cylindrical sleeve 33 which is slidably mounted upon the shaft 6 and prevented from rotating upon the same by means of the key 29. The sleeve 33 is provided at its inner end with a circumferential flange 34. Upon the sleeve 33 is arranged a collar 35 provided at one end with a flange 36, and said collar carries a beveled ring shaped section 37 which forms the periphery of the pulley. The inner end of the collar 35 is screw threaded as at 38 for the reception of a ring-shaped plate 39, which is connected to the flange 36 by means of bolts 40. The ring-shaped section 37 and the collar 35 are both rigidly connected to the sleeve 33 by means of screws 41. A ring 42 is loosely mounted upon the inner portion of the sleeve 33 and engages the flange 34 of the sleeve 33. The ring 42 has formed upon its upper side an upstanding arm 43 provided upon its upper end with an apertured head 44, which is loosely mounted upon the driving shaft 1. By this construction it is obvious that the pulley 31 may be moved into and out of engagement with the friction disk 17, by moving the arm 43 longitudinally of the driving shaft 1. The means for causing such movement of the arm 43 will be described hereinafter. The friction pulley 32 comprises a tubular casing 45 which is mounted upon the shaft 7 and keyed thereto as at 30, whereby said sleeve 45 is capable of moving longitudinally of the shaft 7 and to be rotated by said shaft. Upon the sleeve 45 is arranged a collar 47 having an outer flanged end 48. The collar 45 carries a bevel ring shaped section 49 which forms the periphery of the pulley 32, said section 49 being prevented from displacement by means of a ring shaped plate 50 which is screw-threaded as at 51 upon the inner end of the collar 47. The ring shaped plate 50 is connected to the flange 48 by means of bolts 52. The collar 45 is provided at its outer end with a circumferential flange 53 near which is arranged a ring 54, which is loosely mounted upon the sleeve 45 and is pivotally connected as at 55 to a connecting rod 56.

The casing 12 is provided upon its side adjacent the friction disk 17 with a centrally arranged circular opening, within which is disposed a cylindrical casing 57, having its inner end partially closed by a circular flange 58 which is bolted as at 59 to the friction disk. The casing 57 is provided at diametrically opposite points with apertured bosses, within which are arranged the reduced ends 60 of trunnion bolts 61. The reduced ends 60 are provided with nuts 62 which securely clamp the trunnion bolts to the bosses. Upon the trunnion bolts 61 are rotatably mounted bevel gears 63, which are prevented from having longitudinal movement upon said trunnion bolts, by means of the enlarged heads 64 formed upon the inner end of said trunnions 61. The bevel gears 63 mesh with a larger bevel gear 65 which is rigidly mounted upon the inner end of the sleeve 15. The bevel gears 63 further mesh upon their opposite sides with a corresponding bevel gear 66 which is rigidly mounted upon a tubular sleeve 67, loosely mounted upon the axle 16. The bevel gears 63 and bevel gears 65 and 66 constitute a differential gear mechanism which is adapted to coöperate with the friction disk 17 and its associated members. It is to be understood that the rear wheels of the vehicle are to be rigidly mounted upon the sleeves 15 and 67.

My invention further comprises a controlling lever 68 which is pivotally mounted upon a fixed shaft 69. The controlling lever 68 is provided with a latch device 70 adapted to coöperate with a segmental rack 71 provided with notches 72, 73, 74 and 75, termed, reverse, neutral, forward low speed, and forward high speed. A stripped pinion 76 is rigidly connected to the lower end of the controlling lever 68 and is adapted to be partially rotated when said lever 68 is oscillated. Upon the opposite sides of the stripped pinion 76, are arranged stripped pinions 77 and 78 which mesh with the pinion 76 at diametrically opposite points and are adapted to be partially rotated by said pinion 76. The pinion 77 is provided with a depending lever 79 which is rigidly secured thereto, and the pinion 78 has rigidly secured thereto a depending lever 80. The levers 79 and 80 are pivotally connected as at 81 and 82 to connecting rods 83 and 84 respectively. The connecting rod 83 is pivotally connected as at 85 to a lever 86 which is pivotally connected near its center as at 87, to a stationary support 88 which is formed upon the upper side of the support 9. The lower free end of lever 86 is pivotally connected as at 89 to a connecting rod 90, which is pivotally connected at 91 to the arm 43, which is adapted to move the reverse friction pulley 31. The connecting rod 84 is pivotally connected at 92 to a bell-crank lever 93 which is pivotally mounted upon a trunnion 94, which is fixed to the casing 12. The longer arm 95 of the bell-crank lever 93 is pivotally connected at 96 to rod 56, the forward end of which is pivotally connected at 55 to the ring 54, which is adapted to move the forward low speed friction pulley into engagement with the friction disk. The bell-crank lever 93 is provided at its apex with a short arm 99, to which as at 100 is pivotally connected a rod 101, which has its opposite end pivotally connected at 102 to the upstanding arm 27, which moves the clutch head 22.

In the operation of my device, when the controlling lever 68 is arranged so that its latch device is disposed within the neutral notch 73, the friction pulleys 31 and 32, will be out of engagement with the friction disk 17 and the clutch head 22 will be out of engagement with the pinion 20', whereby the rotation imparted from the driving shaft 1 to the shafts 6 and 7, will not be imparted to the friction disk 17. When it is desired to use the forward low speed, the controlling lever 68 is oscillated forwardly until the latch 70 engages the notch 74. This movement of controlling levers 68 causes the pinion 76 to be rotated counter clock wise whereby the pinions 78 and 77 are rotated clock-wise and the levers 80 and 79 will accordingly be oscillated forwardly. The lever 79 will draw the connecting rod 83 forwardly which will in its turn swing the lever 86 upon its pivot and move the reverse friction pulley 31 farther away from the friction disk 17. At the same time the connecting rod 84 will swing bell-crank lever 93 forwardly and the arm 95 of said bell-crank lever, by means of the connecting rod 56, will urge the forward low speed friction pulley 32 into engagement with the friction disk 17. The lever 99 will also move the connecting rod 101 rearwardly for advancing the clutch head 22 toward the pinion 20. The clutch head 22 has a much greater distance to travel for engagement with the bevel gear 20 than the pulley 32 has to travel before said pulley 32 engages said friction disk 17 and therefore the clutch head 22 will be moved toward but not into engagement with the gear 20, when the controlling lever 68 is moved to the forward low speed notch 74. When the lever 68 is oscillated forwardly still farther so that the latch 70 engages the forward high speed notch 75, the connecting rod 83 will accordingly be moved forwardly a greater distance and the reverse friction pulley 31 will be moved still farther away from the friction disk. At the same time the connecting rod 84 will be moved forwardly for swinging the bell-crank lever 93 forwardly again. The arm 95 of the bell-crank lever will draw the connecting rod 56 rearwardly until said arm 95 reaches its rearmost point of travel when the same will be oscillated forwardly and the forward low speed friction pulley 32 will be moved forwardly upon the shaft 7 out of engagement with the friction disk. At the same time the arm 99 will move connecting rod 101 rearwardly which will in turn move the clutch head 22 into engagement with the bevel gear 20′ for locking said bevel gear 20′ to the shaft 7, whereby the friction disk 17 will be driven at forward high speed. When the lever 68 is moved rearwardly to the reverse notch 72, it is obvious that the reverse friction pulley 31 will be urged into engagement with the friction disk 17, and at the same time the forward low speed friction disk 32 will be disengaged from the friction disk and the clutch head 22 moved away from the pinion 20′.

When the friction disk 17 is driven by the reverse friction pulley or the forward low speed friction pulley or the forward high speed bevel gear 20′, it is obvious that said friction disk carries with it the casing 57, which constitutes a portion of the differential gear mechanism above described. The rotation of the casing 57 will be imparted by means of the bevel gears 63 to the bevel gears 65 and 66, which are adapted to rotate the sleeves 15 and 57 respectively. It will thus be seen that normally the sleeves 15 and 67 will be rotated at the same rate of speed. However, should the sleeve 15 be positively prevented from rotating, and the sleeve 67 be free to rotate, said sleeve 67 would then rotate twice as fast as before.

Having fully described my invention what I claim is:—

1. In a device of the character described, a driving shaft, a rotary disk, driven shafts arranged in end to end relation to each other near said disk, means carried by the driven shafts for alternately engaging the disk to actuate the same in opposite directions, and connecting means between the driving and driven shafts.

2. In a device of the character described, a driving shaft, a rotary disk, driven shafts arranged in end to end relation to each other upon the same side of said disk, connecting means between the driving and driven shafts, and means connected to the driven shafts to engage the disk at substantially diametrically opposite points.

3. In a device of the character described, a driving shaft, a rotary disk, driven shafts arranged in end to end relation to each other upon the same side of said disk, connecting means between the driving and driven shafts, means connected to the driven shafts to engage the disk at substantially diametrically opposite points, and a differential gear mechanism connected to said disk.

4. In a device of the character described, a driving shaft, a rotary disk, driven shafts arranged in end to end relation to each other upon the same side of said disk, connecting means between the driving and driven shafts, and means keyed upon the driven shafts to engage said disk at substantially diametrically opposite points.

5. In a device of the character described, a driving shaft, a rotary disk, driven shafts arranged in end to end relation to each other, connecting means between the driving and driven shafts, means keyed upon the driven shafts to engage the disk at substantially diametrically opposite points for actuating the same in opposite directions, and means for moving said means longitudinally of the driven shafts.

6. In a device of the character described, a driving shaft, a rotary disk, driven shafts arranged in end to end relation to each other near said disk, means carried by the driven shafts for alternately engaging the disk at substantially diametrically opposite points to actuate the same in opposite directions, connecting means between the driving and driven shafts, and a differential gear mechanism mounted upon said disk.

7. In a device of the character described, the combination with a driving shaft, of shafts adapted to be driven by said driving shaft, a disk arranged in coöperative relation to said shafts, friction pulleys keyed upon said shafts and adapted to be urged into engagement with said friction disk, a bevel gear rigidly mounted upon said disk, a second bevel gear loosely mounted upon one of said shafts, a clutch mechanism for locking said last named bevel gear to its shaft, a controlling lever having connecting means with said friction pulleys and said clutch device whereby said friction disk may be driven alternately by either of said friction pulleys and by said last named bevel gear, and a differential gear mechanism connected to said friction disk.

8. The combination with a driving shaft, provided with pinions, of a plurality of shafts provided with pinions meshing with said first named pinions, a friction disk provided with a bevel gear rigidly secured thereto, arranged in operative relation to said plurality of shafts, friction pulleys keyed upon said last named shafts and adapted to engage said friction disk, a bevel gear loosely mounted upon one of said shafts and arranged to engage said first named bevel gear, a lever pivotally mounted near its middle on a fixed support and having one end connected to one of said friction pulleys, a bell-crank lever pivotally mounted upon a fixed support and pivotally connected to the other of said friction pulleys, a clutch mechanism for locking said last named bevel gear to its shaft, means connecting said clutch mechanism to said bell-crank lever, connecting rods pivotally connected to said bell-crank lever and said lever pivotally mounted near its center, and a controlling lever having means connected thereto and to said connecting rods for moving said connecting rods in the same direction.

9. In a device of the character described, the combination with a driving shaft, of a plurality of shafts driven by said driving shaft, a disk arranged in operative relation to said plurality of shafts, said plurality of shafts being arranged diametrically of said disk, means arranged upon said plurality of shafts for alternately driving said disk in opposite directions and at high and low speeds, and a differential gear mechanism connected to said disk.

In testimony whereof I affix my signature in presence of two witnesses.

CHARLES M. LEECH.

Witnesses:
NELLIE HOOVER,
F. C. DALZELL.